(12) United States Patent
Chabin et al.

(10) Patent No.: US 8,249,510 B2
(45) Date of Patent: Aug. 21, 2012

(54) METHOD AND SYSTEMS TO FACILITATE REDUCING INTERFERENCE BETWEEN RF SIGNALS

(75) Inventors: Eric Chabin, Chanhassen, MN (US); Daniel Joseph Dee, Roseville, MN (US); Kevin Gerard Stebbins, Maplewood, MN (US); Uwe Hans Thomanschefsky, Shoreview, MN (US)

(73) Assignee: UTC Fire & Security Americas Corporation, Inc., Bradenton, FL (US)

( * ) Notice: Subject to any disclaimer, the term of this patent is extended or adjusted under 35 U.S.C. 154(b) by 656 days.

(21) Appl. No.: 12/369,304

(22) Filed: Feb. 11, 2009

(65) Prior Publication Data

US 2010/0201511 A1  Aug. 12, 2010

(51) Int. Cl.
*H04B 1/00* (2006.01)

(52) U.S. Cl. ................. 455/63.1; 455/67.13

(58) Field of Classification Search .......... 330/63.1, 330/63.4, 67.1, 67.11, 67.13, 70, 414, 1, 330/423, 424, 456.4–456.6, 512, 522
See application file for complete search history.

(56) References Cited

U.S. PATENT DOCUMENTS

| | | | |
|---|---|---|---|
| 5,461,365 A | 10/1995 | Schlager et al. | |
| 5,740,165 A | 4/1998 | Vannucci | |
| 5,801,626 A | 9/1998 | Addy | |
| 6,294,992 B1 | 9/2001 | Addy et al. | |
| 7,079,020 B2 | 7/2006 | Stilp | |
| 7,084,756 B2 | 8/2006 | Stilp | |
| 7,091,827 B2 | 8/2006 | Stilp | |
| 7,202,789 B1 | 4/2007 | Stilp | |
| 7,260,424 B2 | 8/2007 | Schmidt | |
| 7,283,048 B2 | 10/2007 | Stilp | |
| 2004/0203400 A1* | 10/2004 | Galetti | 455/63.1 |
| 2007/0004440 A1* | 1/2007 | Breuer et al. | 455/63.1 |
| 2009/0318087 A1* | 12/2009 | Mattila et al. | 455/63.1 |

* cited by examiner

*Primary Examiner* — Khanh V Nguyen
(74) *Attorney, Agent, or Firm* — MH2 Technology Law Group, LLP

(57) ABSTRACT

A method for reducing interference between radio frequency (RF) signals includes initiating a first communication session from a control system to a remote RF device using a first RF signal to transmit a first outgoing message, wherein the first RF signal within a first RF range, and detecting a second communication session transmitted from a system RF device to the control system using a second RF signal. The second communication session includes an incoming message, and the second RF signal is within a second RF range at least partially overlapping the first RF range. The method includes, when the second communication session is detected, interrupting the first communication session for a time period, receiving the second communication session during the time period to receive the incoming message, and, after the time period expires, resuming the first communication session with the remote RF device.

20 Claims, 8 Drawing Sheets

METHOD AND SYSTEMS TO FACILITATE REDUCING INTERFERENCE BETWEEN RF SIGNALS

BACKGROUND OF THE INVENTION

1. Field of the Invention

The embodiments described herein relate generally to a method and systems to facilitate reducing interference between at least two radio frequency (RF) signals and, more particularly, to a method and systems to facilitate reducing interference between Global System for Mobile Communications (GSM) signals and RF signals.

2. Description of the Related Art

At least some RF signals are GSM signals. More specifically, GSM signals are used in some known cellular telephone systems. The GSM standard uses Time Division Multiple Access (TDMA) to allow multiple telephones to communicate simultaneously with a base station. GSM cellular telephones transmit data in bursts at a rate of 217 Hz. As such, an electric field strongly modulated at 217 Hz results from transmissions of the GSM cellular telephones. At least some known GSM devices operate at frequencies ranging between 800 MHz to 1900 MHz, however, the 217 Hz envelope frequency is consistent. Further, the frame structure according to the GSM standard includes eight time slots per frame. Each GSM device in communication with the base station uses only one time slot per frame for communicating with the base station.

At least some RF devices, other than GSM devices, transmit RF signals within the same frequency range as GSM devices. However, RF signals transmitted by other RF devices may have a power level that is less than the power level of the GSM signals such that the GSM signals interfere with the transmission/reception of the other RF signals. As such, when a GSM device and another RF device that transmit within the same or overlapping frequencies are used proximate each other, the GSM signal interferes with the other RF signals by dominating the frequency such that the RF signal is not properly received. More specifically, when an RF transmitter-receiver is positioned at a distance from a GSM transmitter-receiver at which GSM signals overpower other RF signals, the RF transmitter-receiver does not properly receive RF signals other than the GSM signals. Furthermore, even where a GSM signal and another RF signal are not transmitted on overlapping frequencies, harmonics of one of the signals may occupy the same range of RF spectrum as the other signal. Accordingly, a need exists for a system and/or method for allowing GSM devices and other RF devices transmitting within the same or overlapping frequencies, or emitting interfering harmonics, to be used within a close proximity of each other such that interference between GSM signals and other RF signals is reduced.

BRIEF SUMMARY OF THE INVENTION

In one aspect, a method for reducing interference between radio frequency (RF) signals is provided. The method includes initiating a first communication session from a control system to a remote RF device using a first RF signal to transmit a first outgoing message to the remote RF device, wherein the first RF signal within a first RF range, and detecting, at the control system, a second communication session transmitted from a system RF device to the control system using a second RF signal. The second communication session includes an incoming message from the system RF device, and the second RF signal is within a second RF range at least partially overlapping the first RF range. The method further includes, when the second communication session is detected, interrupting the first communication session for a time period, receiving the second communication session during the predetermined time period to receive the incoming message from the system RF device, and, after the time period expires, resuming the first communication session with the remote RF device.

In another aspect, a control system is provided. The control system includes a radio frequency (RF) transmitter-receiver module configured to transmit and receive first RF signals within a first RF range. The RF transmitter-receiver module includes at least one RF transmitter-receiver. The control system further includes an RF receiver module configured to receive second RF signals within a second RF range that at least partially overlaps the first RF range. The RF receiver module includes at least one RF receiver. The control system includes a processor coupled in communication with the RF transmitter-receiver module and the RF receiver module. The processor is configured to engage in a first communication session with a remote RF device using the RF transmitter-receiver module to transmit a first outgoing message within the first RF signals, detect a second communication session within the second RF signals using the RF receiver module, wherein the second RF signals are transmitted by a system RF device and include an incoming message encoded therein, and when the second communication session is detected, interrupt the first communication session for a time period. The processor is further configured to receive the second RF signals during the time period using the RF receiver module, and, after the time period expires, resume the first communication session.

In yet another aspect, a security system is provided. The security system includes at least one sensor including a radio frequency (RF) transmitter, and at least one remote device including an RF transmitter-receiver. The at least one remote device is located remotely from the at least one sensor. The security system further includes a control system including at least one RF receiver configured to communicate with the at least one sensor and at least one RF transmitter-receiver configured to communicate with the at least one remote device. The control system is located remotely from the at least one sensor and the at least one remote device. The control system is configured to initiate a first transmission session of a first RF signal to the at least one remote device. The first RF signal is within a first RF range, and the first RF signal has a first outgoing message encoded therein. The control system is further configured to detect a second transmission session of a second RF signal transmitted by the at least one sensor, wherein the second RF signal within a second RF range at least partially overlaps the first RF range, and when the second transmission session is detected, interrupt the first transmission for a time period. The control system is configured to receive at least one incoming message from the at least one sensor during the time period, wherein the at least one incoming message encoded in the second RF signal, and after the time period expires, resume the first transmission session with the first outgoing message encoded therein to the at least one remote device.

By interrupting transmission of GSM signals, the embodiments described herein allow less powerful RF signals within the same, or an overlapping, frequency range to be properly received by an RF receiver positioned proximate a GSM transmitter-receiver. As such, an RF receiver and a GSM transmitter-receiver operating within the same, or overlapping, frequency range can be positioned proximate to each other and properly receive and/or transmit signals. It will be understood that the embodiments described herein may also be used with any suitable RF transmitter-receivers operating in relative proximity and using at least partially overlapping frequency ranges, whether through a primary signal or harmonics thereof.

BRIEF DESCRIPTION OF THE DRAWINGS

FIG. 1 is schematic diagram of an exemplary security system.

FIG. 2 is graph of exemplary frequency ranges of radio frequency signals transmitted and received within the security system shown in FIG. 1.

FIG. 3 is a diagram of a message packet transmitted within the security system shown in FIG. 1.

FIG. 4 is a flowchart of an exemplary method that may be used with the security system shown in FIG. 1.

FIG. 5 is a diagram of exemplary signals that may be communicated within the security system shown in FIG. 1.

FIG. 6 is a flowchart of a first alternative method that may be used with the security system shown in FIG. 1.

FIG. 7 is a flowchart of a second alternative method that may be used with the security system shown in FIG. 1

FIG. 8 is a flowchart of a third alternative method that may be used with the security system shown in FIG. 1.

DETAILED DESCRIPTION OF THE INVENTION

Figure 1:
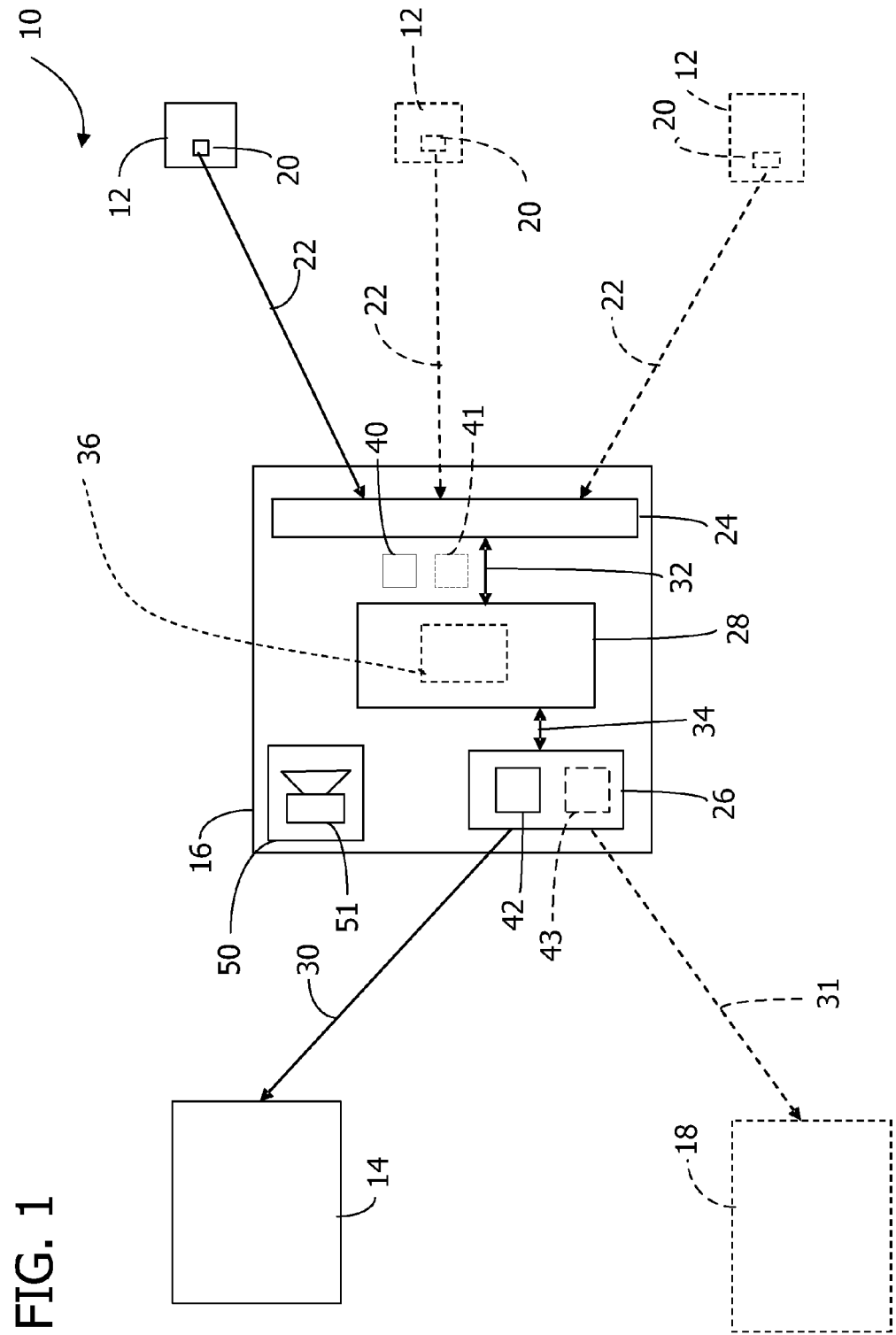
FIGS. 1-8 show exemplary embodiments of the system and method described herein.

The embodiments described herein provide a method and systems to allow GSM devices and other RF devices transmitting within the same, or overlapping frequencies, to be within a close proximity to each other. More specifically, by interrupting transmission of GSM signals, less powerful RF signals within the same, or an overlapping, frequency range can be properly received by an RF receiver positioned proximate a GSM transmitter, for example, within the same control panel. Further, although GSM signals are described herein, it should be understood that the embodiments described herein can be used when any two RF signals are within the same, or an overlapping, frequency range.

Many of the components of the security system described herein include a processor. As used herein, the term "processor" is not limited to just those integrated circuits referred to in the art as a computer, but broadly refers to a microcontroller, a microcomputer, a programmable logic controller (PLC), an application specific integrated circuit, and other programmable circuits, and these terms are used interchangeably herein. It should be understood that a processor and/or control system can also include memory, input channels, and/or output channels. In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, input channels include, without limitation, computer peripherals associated with an operator interface, such as a mouse and a keyboard. Further, in the exemplary embodiment, output channels may include, without limitation, an operator interface monitor and/or display.

The processor described herein processes information transmitted from a plurality of electrical and electronic devices that may include, without limitation, security system sensors and/or monitoring devices. Such processor may be physically located in, for example, a control system, sensors, monitoring devices, desktop computers, laptop computers, PLC cabinets, and/or distributed control system (DCS) cabinets. RAM and storage devices store and transfer information and instructions to be executed by the processor. RAM and storage devices can also be used to store and provide temporary variables, static (i.e., non-changing) information and instructions, or other intermediate information to the processors during execution of instructions by the processors. Instructions that are executed may include, without limitation, security system control commands. The execution of sequences of instructions is not limited to any specific combination of hardware circuitry and software instructions.

Further, although the security system as described herein includes sensors, it should be understood that the systems and method described herein may include any suitable remote radio frequency (RF) device that transmits an RF signal to a control system configured to receive RF signals and to transmit another RF signal in the same frequency range, such as Global System for Mobile Communications (GSM) signals. Moreover, the term "GSM signal" as used herein refers to a certain type and/or a range of RF signals.

Figure 2:
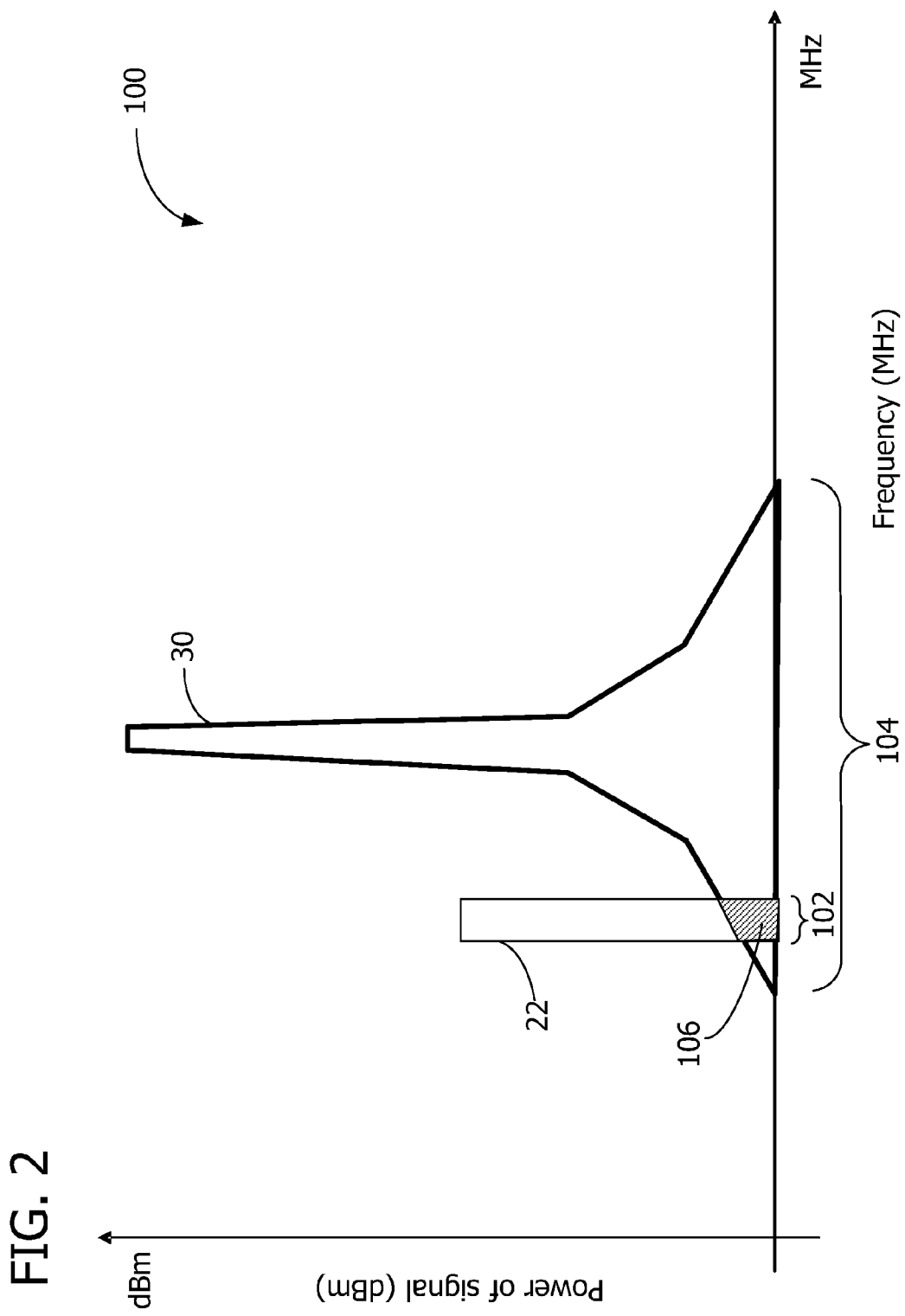

FIG. 1 shows an exemplary security system 10. FIG. 2 shows a graph 100 of exemplary radio frequency ranges of RF signals transmitted and received within security system 10. Security system 10 can be used within residential, commercial, and/or industrial settings. In one embodiment, security system 10 is a residential alarm system.

In the exemplary embodiment, security system 10 includes at least one system RF device or sensor 12, a remote RF device 14 located remotely from sensor 12, and a control system 16, such as a control panel, located remotely from sensor 12 and remote RF device 14. Control system 16 is in communication with sensor 12 and remote RF device 14, as described in more detail herein. In one embodiment, sensor 12 and control system 16 are located at different locations within the same building, such as a home, and remote RF device 14 is located remotely from the building. Security system 10 may also optionally include a second remote RF device 18 in communication with control system 16. In one embodiment, second remote RF device 18 is a homeowner's cellular telephone, however, it should be understood that second remote RF device 18 is any suitable device configured to communicate with at least control system 16. Other examples of second remote RF device 18 include a secondary monitoring station and/or a law-enforcement device.

In the exemplary embodiment, security system 10 includes at least one sensor 12. In a particular embodiment, security system 10 includes a plurality of sensors 12, each in communication with control system 16. For example, in a residential setting, sensors 12 may be located throughout the house and communicate with control system 16 that is located centrally within the house. In the exemplary embodiment, sensor 12 is considered to be a "wireless" sensor and is not hardwired to control system 16. Alternatively, sensor 12 may be wireless with a hardwire back-up. In the exemplary embodiment, sensor 12 is at least one of a motion sensor, a glass-break sensor, a door sensor, a window sensor, a smoke sensor, a temperature sensor, a water sensor, a shock sensor, a carbon monoxide sensor, and any other suitable type of sensors. When security system 10 includes a plurality of sensors 12, security system 10 includes any suitable combination of types of sensors.

In the exemplary embodiment, sensor 12 includes an RF transmitter 20. RF transmitter 20 is configured to broadcast or transmit RF signals 22 within a first predetermined RF range 102, as shown in FIG. 2. When sensor 12 is activated by, for example, detecting a change in a condition and/or detecting a condition not satisfying predetermined criteria, sensor 12 transmits RF signals 22 using RF transmitter 20.

Figure 3:
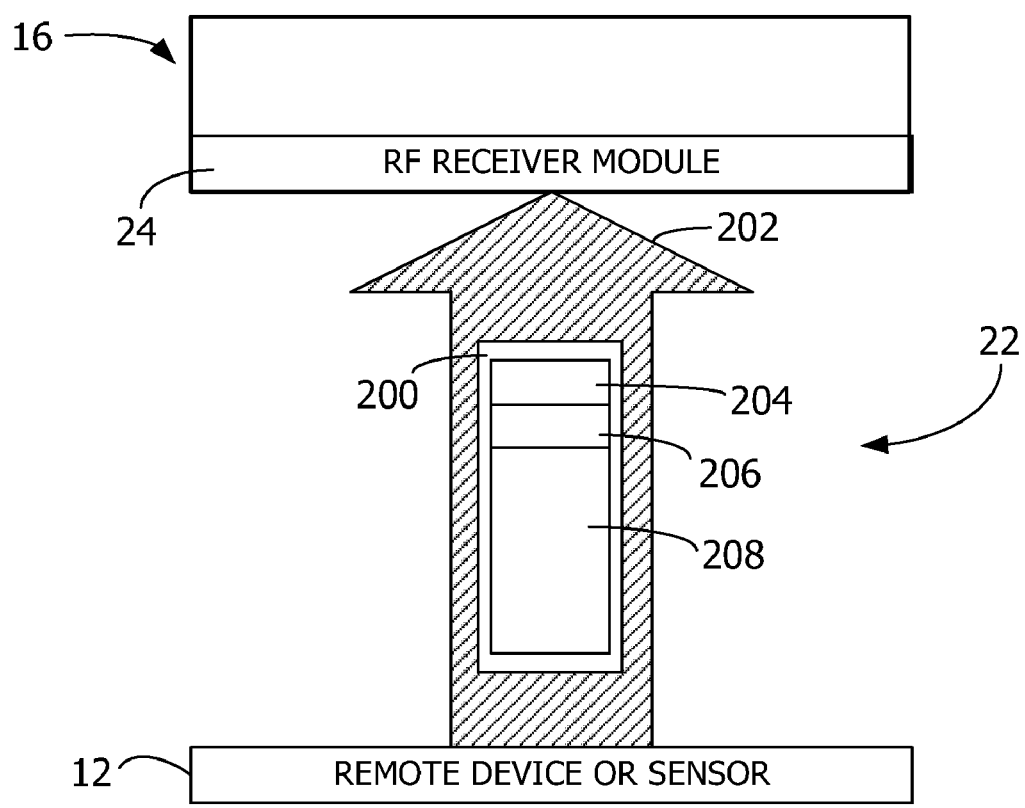

FIG. 3 is a diagram of a message packet 200 transmitted within security system 10 (shown in FIG. 1). More specifically, message packet 200 is transmitted from sensor 12 (shown in FIG. 1) to control system 16 (shown in FIG. 1). Referring to FIGS. 1 and 3, in the exemplary embodiment, when sensor 12 is activated, sensor 12 transmits a message packet 200 in each transmission packet 202 in RF signals 22 to indicate the activation of sensor 12. In the exemplary embodiment, each message packet 200 includes a synchronization portion 204, a start portion 206, and a message portion 208. Synchronization portion 204 and start portion 206 may be limited to a single bit each. Further, in the exemplary embodiment, each message packet 200 is repeated in a plurality of transmission packets 202 in RF signals 22, each transmitted at a predetermined time interval 416 (shown in FIG. 5). It should be understood that message packet 200 may include any suitable number of bits and/or be any suitable packet that enables security system 10 to function as described herein.

Referring to FIGS. 1 and 3, in the exemplary embodiment, control system 16 includes an RF receiver module 24, an RF transmitter-receiver module 26, and a processor 28 coupled in communication with RF receiver module 24 and RF transmitter-receiver module 26. RF receiver module 24 includes at least one RF receiver 40. In an alternative embodiment, control system 16 includes an additional RF receiver 41 within RF receiver module 24. If multiple RF receivers are included in RF receiver module 24, each may use a different RF range. Similarly, RF transmitter-receiver module 26 includes at least one RF transmitter-receiver 42. In an alternative embodiment, control system 16 includes an additional RF transmitter-receiver 43 within RF transmitter-receiver module 26. If multiple RF transmitter-receivers are included in RF transmitter-receiver 26, each may use a different RF range. RF transmitter-receiver 42 is, in the exemplary embodiment, a GSM transmitter, however, it should be understood that RF transmitter-receiver module 26 may contain any suitable type or types of transmitter enabling security system 10 to function as described herein.

In the exemplary embodiment, because RF receiver module 24 and RF transmitter-receiver module 26 are within control system 26, RF receiver module 24 and RF transmitter-receiver module 26 are positioned proximate each other. RF receiver module 24 receives RF signals 22 from sensor 12 within first RF range 102, and RF transmitter-receiver module 26 transmits and/or receives RF signals 30 and 31, such as GSM signals, within a second RF range 104, as shown in FIG. 2. In the exemplary embodiment, second RF range 104 at least partially overlaps first RF range 102. More specifically, graph 100 shows a power, in decibels in reference to one milliwatt (dBm), of RF signal 22 and RF signal 30 with respect to a frequency, in megahertz (MHz), of each RF signal 22 and 30.

In the exemplary embodiment, RF transmitter-receiver module 26 transmits RF signal 30 to remote RF device 14. When RF transmitter-receiver module 26 transmits RF signal 30, control system 10 initiates a call to remote RF device 14 using RF transmitter-receiver module 26. More specifically, RF transmitter-receiver module 26 transmits RF signals 30 when an event occurs as determined by control system 10. For example, RF transmitter-receiver module 26 transmits RF signals 30 to remote RF device 14 when sensor 12 is activated and control system 16 receives RF signals 22 from sensor 12. RF transmitter-receiver module 26 may also transmit RF signals 30 when security system 10 contacts remote RF device 14 to perform a status check and/or a test, or when performing any other suitable communications. RF transmitter-receiver module 26 may also communicate with a second remote device 18 by transmitting and receiving RF signals 31.

In the exemplary embodiment, a unidirectional communication is transmitted between RF transmitter-receiver module 26 and remote device 14 using RF signals 30, however RF signal 30 may be bidirectional. Further, RF transmitter-receiver module 26 is shown in bidirectional communication with second remote device 18 using RF signals 31. In one embodiment, second remote device 18 is a cellular telephone requesting a status report from RF transmitter-receiver module 26 of control system 16. In this embodiment, second remote device 18 initiates the communication. In an alternative embodiment, processor 28 may be configured to automatically report certain events to second remote device 18 using RF transmitter-receiver module 26. In this embodiment, RF transmitter-receiver module 26 initiates the communication. Processor 28 may also be configured to take other action in response to events. For example, processor 28 may activate an alarm module 50. In the exemplary embodiment, alarm module 50 includes a speaker 51 which functions as an audible alarm. Alternatively, or additionally, other alarm mechanisms, such as visible alarm, can be included in alarm module 50.

In the exemplary embodiment, processor 28 receives data 32 from RF receiver module 24 and transmits commands 34 to RF transmitter-receiver module 26. It should be understood that, in addition to receiving data 32 and transmitting commands 34, processor 28 receives and/or transmits any suitable data, signals, and/or instructions that enable security system 10 to function as described herein. In the exemplary embodiment, processor 28 uses data 32 to perform a method 300 (shown in FIG. 4) for facilitating reducing interference between RF signals 22 and RF signals 30 and/or 31. Commands 34 transmitted by processor 28 are determined using method 300. In the exemplary embodiment, at least one command 34 issued by processor 28 to RF transmitter-receiver module 26 interrupts RF signals 30 transmitted by RF transmitter-receiver module 26 for a predetermined time period 408 (shown in FIG. 5). Another example of a command 34 issued by processor 28 to RF transmitter-receiver module 26 is a command that prevents RF transmitter-receiver module 26 from transmitting RF signals 30 during at least a portion of predetermined time period 408.

Referring to FIGS. 1 and 2, in a particular embodiment, control system 10 optionally includes a notch filter 36. More specifically, notch filter 36 additionally, or alternatively, facilitates reducing interference between RF signals 22 and RF signals 30. More specifically, notch filter 36 removes RF signals 30 having a frequency in first RF range 102 by filtering RF signals 30 transmitted by RF transmitter-receiver module 26 and/or control system 16. As such, notch filter 36 facilitates eliminating an overlap 106 between first RF range 102 and second RF range 104. When first RF range 102 and second RF range 104 do not overlap, transmission of RF signals 30 does not substantially interfere with control system 16 receiving RF signals 22.

Figure 4:
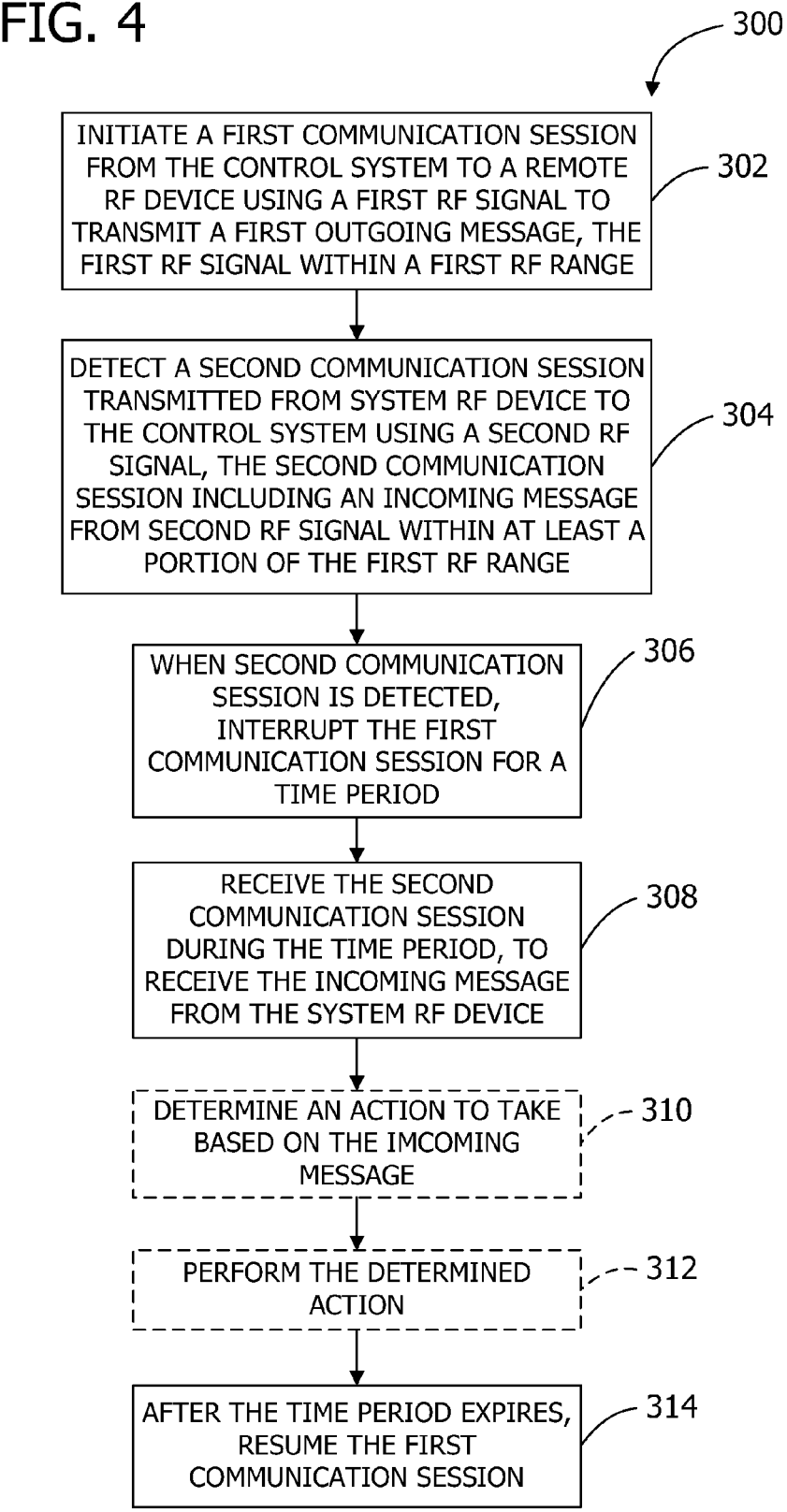
Figure 5:
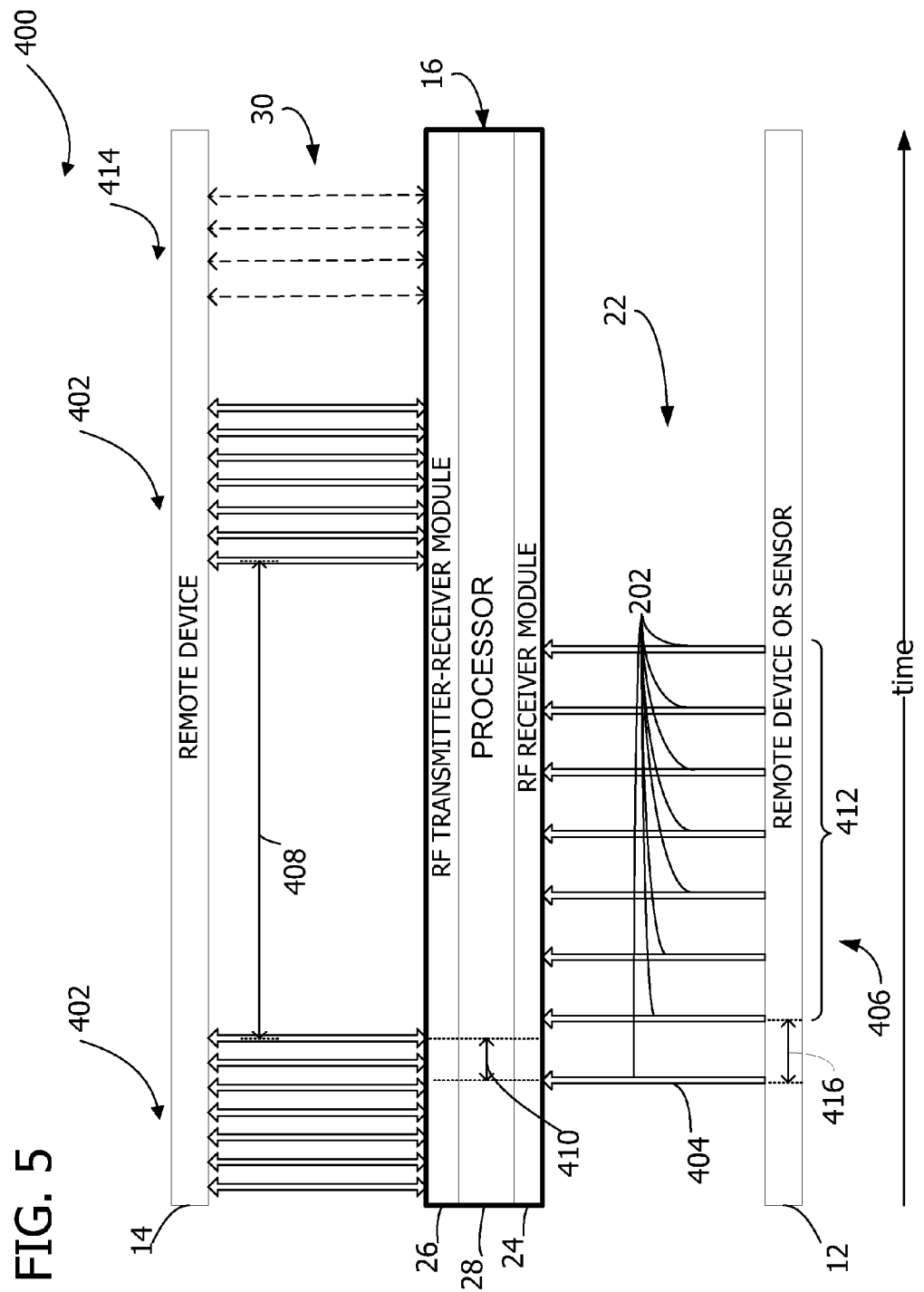

FIG. 4 is a flowchart of exemplary method 300 that may be used with security system 10 (shown in FIG. 1). FIG. 5 is a diagram 400 of exemplary signals that may be communicated within security system 10 (shown in FIG. 1). Referring to FIGS. 1-5, in the exemplary embodiment, method 300 is performed by control system 16 when RF signals 30 are being transmitted by control system 16. If RF signals 30 are not being transmitted when RF signals 22 are received by control system, method 300, method 500 (shown in FIG. 6), method 600 (shown in FIG. 7), and/or method 700 (shown in FIG. 8) are not performed. Rather, control system 16 receives RF signal 22 and determines an action to perform based on an incoming message encoded in RF signal 22.

In the exemplary embodiment, control system 16 initiates 302 a first communication session 402 from control system 16 to remote RF device 14 using RF signals 30 to transmit a first outgoing message to remote RF device 14. RF signals 30 are within first RF range 104 of the radio frequency spectrum. During transmission of the first outgoing message, control system 16 detects 304 a first transmission packet 404 of a plurality of transmission packets 202 within a second communication session 406 transmitted from system RF device 12 to control system 16 using RF signals 22. Second communication session 406 includes an incoming message from system RF device 12. RF signals 22 are within at least a portion 106 of first RF range 104 of RF spectrum.

In the exemplary embodiment, RF receiver module 24 detects 304 first transmission packet 404 carried by RF signal 22 despite interference that may be caused by RF signal 30 in portion 106 of RF spectrum. RF signals 22 may, however, be difficult to process correctly because of the interference. For example, message packet 200 within first transmission packet 404 may be corrupted. In the exemplary embodiment, when control system 16 detects 304 first transmission packet 404, control system 16 interrupts 306 first communication session 402 for a time period 408. In one embodiment, time period 408 is about 5 seconds (sec). It should be understood that interruption 306 may not be immediate, and a delay 410 may occur while first transmission packet 404 is received by RF receiver module 24 and processed by processor 28.

After interrupting 306 first communication session 402, control system 16 receives 308 second communication session 406 during time period 408 to receive the incoming message from system RF device 12. In the exemplary embodiment, second communication session 406 includes a series of identical transmission packets 202 within RF signals 22 that each include the incoming message. Transmission packets 202 transmitted after first transmission packet 404 are referred to herein as subsequent transmission packets 412. In the exemplary embodiment, RF receiver module 24 receives 308 subsequent transmission packets 412 occurring after first transmission packet 404 during time period 408. Further, during time period 408, RF receiver module 24 receives 308 subsequent transmission packets 412 without interference from RF signals 30 because first transmission session 402 has been interrupted 306. As such, RF receiver module 24 receives 308 the incoming message from system RF device 12 by receiving one or more message packets 200 during time period 408.

More specifically, transmission packets 202 from system RF device 12 each include a message packet 200 encoded in RF signals 22. After RF signal 30 has been interrupted 306, control system 16 receives 304 second communication session 406 by receiving any remaining message packets 200 in RF signals 22 during time period 408. In the exemplary embodiment, such message packets 200 each include encoded therein the incoming message that has not been corrupted by interference from RF signals 30. For example, if sensor 12 is activated, sensor 12 transmits message packets 200 that include an incoming message indicating that sensor 12 has been activated. In the exemplary embodiment, control system 16 receives 308 RF signals 22 from sensor 12 using RF receiver module 24.

In a particular embodiment, when control system 16 receives 308 RF signals 22 at RF receiver module 24, the incoming message is transferred to processor 28 to determine 310 an action to perform 312 based on the message. Actions to perform 312 may include, without limitation, transmitting RF signals 30 to communicate the incoming message received in message packets 801 from RF signals 22; performing a check and/or test of security system 10; sounding a siren using alarm module 50; resuming normal operation; and/or any other suitable action. In one embodiment, control system 16 optionally transmits RF signals 30 to communicate the incoming message to remote RF device 14, as described in more detail below in reference to FIGS. 7 and 8. Accordingly, in such embodiments, control system 16 can indicate to remote RF device 14 and/or second remote device 18 that sensor 12 has been activated, that an event has occurred, and/or that a condition is present. As such, control system 16 transmits RF signals 30 to alert at least a user at remote RF device 14 that sensor 12 has been activated and/or sensed an event or condition. Accordingly, the user can then perform appropriate actions based on the type and/or placement of sensor 12 that was activated. Control system 16 may also transmit such a message to second remote device 18 using RF signals 31.

In the exemplary embodiment, after time period 702 expires, control system 16 resumes 314 first communication session 402. In the exemplary embodiment, sensor 12 completes transmission of the series of transmission packets 202 within RF signals 22 before control system 16 resumes 314 transmitting RF signals 30 to remote RF device 14. In the exemplary embodiment, first communication session 402 with remote RF device 14 is paused and resumed, however, as described in reference to FIG. 6, a new transmission session, i.e. a third transmission session 414, may be initiated to complete communication of the first outgoing message to remote RF device 14 after second transmission session 406 is received 308. Further, as described in reference to FIGS. 7 and 8, the incoming message encoded in second transmission session 406 may be either transmitted to remote RF device 14 concurrently with the first outgoing message or transmitted to remote RF device 14 before or after the completed transmission of the first outgoing message. When the incoming message is transmitted from control system 16 to at least remote RF device 14, the incoming message is referred to herein as a second outgoing message.

Figure 6:
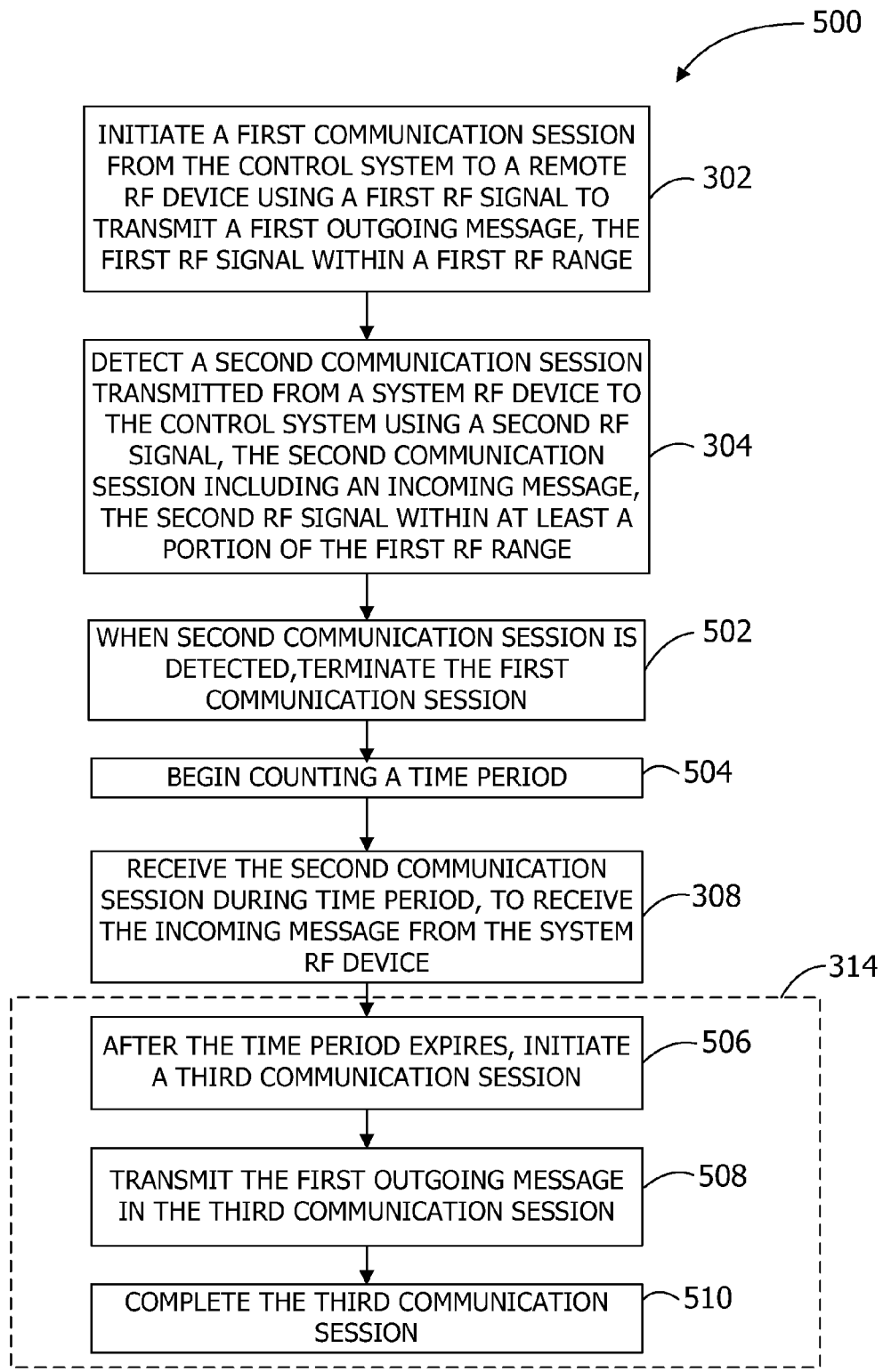

FIG. 6 is a flowchart of a first alternative method 500 that may be used with security system 10 (shown in FIG. 1). Method 500 may include some of the steps of method 300 and, as such, similar components are labeled with similar references. Referring to FIGS. 1, 5, and 6, method 500 includes steps 302 304, 308, and 314 as described above. Additionally, when second communication session 406 is detected 304, control system 16 terminates 502 first communication session 402 and begins counting 504 time period 408. After first communication session 402 is terminated 502, control system receives 308 the incoming message encoded in second communication session 406 during time period 408.

After time period 408 expires, control system 16 initiates 506 third communication session 414 (shown in FIG. 5). More specifically, initiating 506 third communication session 414 includes transmitting RF signals 30 to remote RF device 14. Control system transmits 508 at least the first outgoing message to remote RF device 14 in third communication session 414. When the first outgoing message has been transmitted 508 to remote RF device 14, control system 16 completes 510 third transmission session 414.

Figure 7:
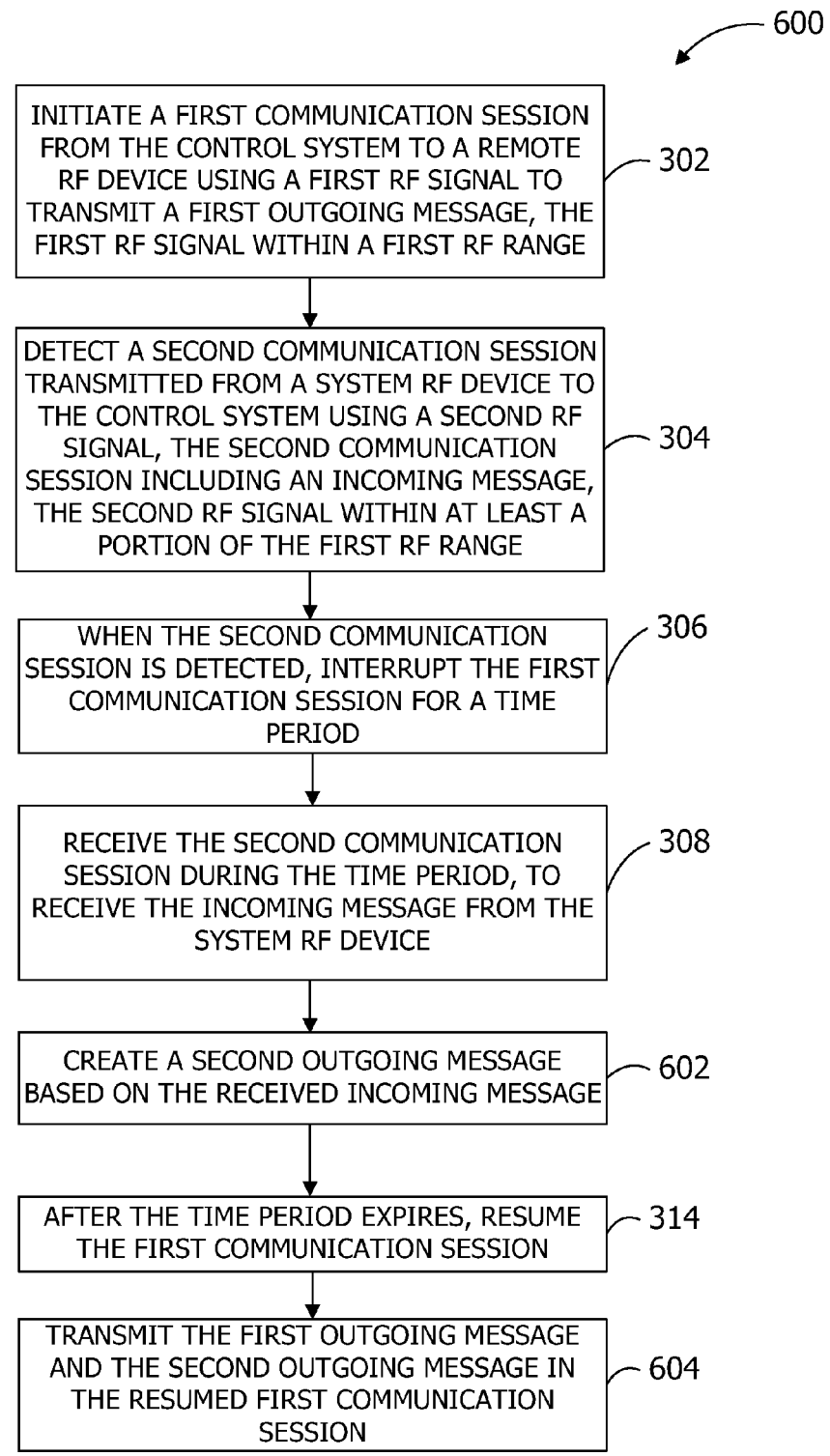

FIG. 7 is a flowchart of a second alternative method 600 that may be used with security system 10 (shown in FIG. 1).

Method 600 may include some of the steps of method 300 and, as such, similar components are labeled with similar references. Referring to FIGS. 1, 5, and 7, method 600 includes steps 302, 304, 306, 308, and 314 as described above. In the exemplary embodiment, when control system 16 receives the incoming message encoded in second transmission session 406, control system 16 creates 602 a second outgoing message based on the incoming message. After time period 408 expires, control system 16 resumes 314 first communication session 402. During the resumed first transmission session 402, control system 16 transmits 604 the first outgoing message and the second outgoing message to remote RF system 14.

Figure 8:
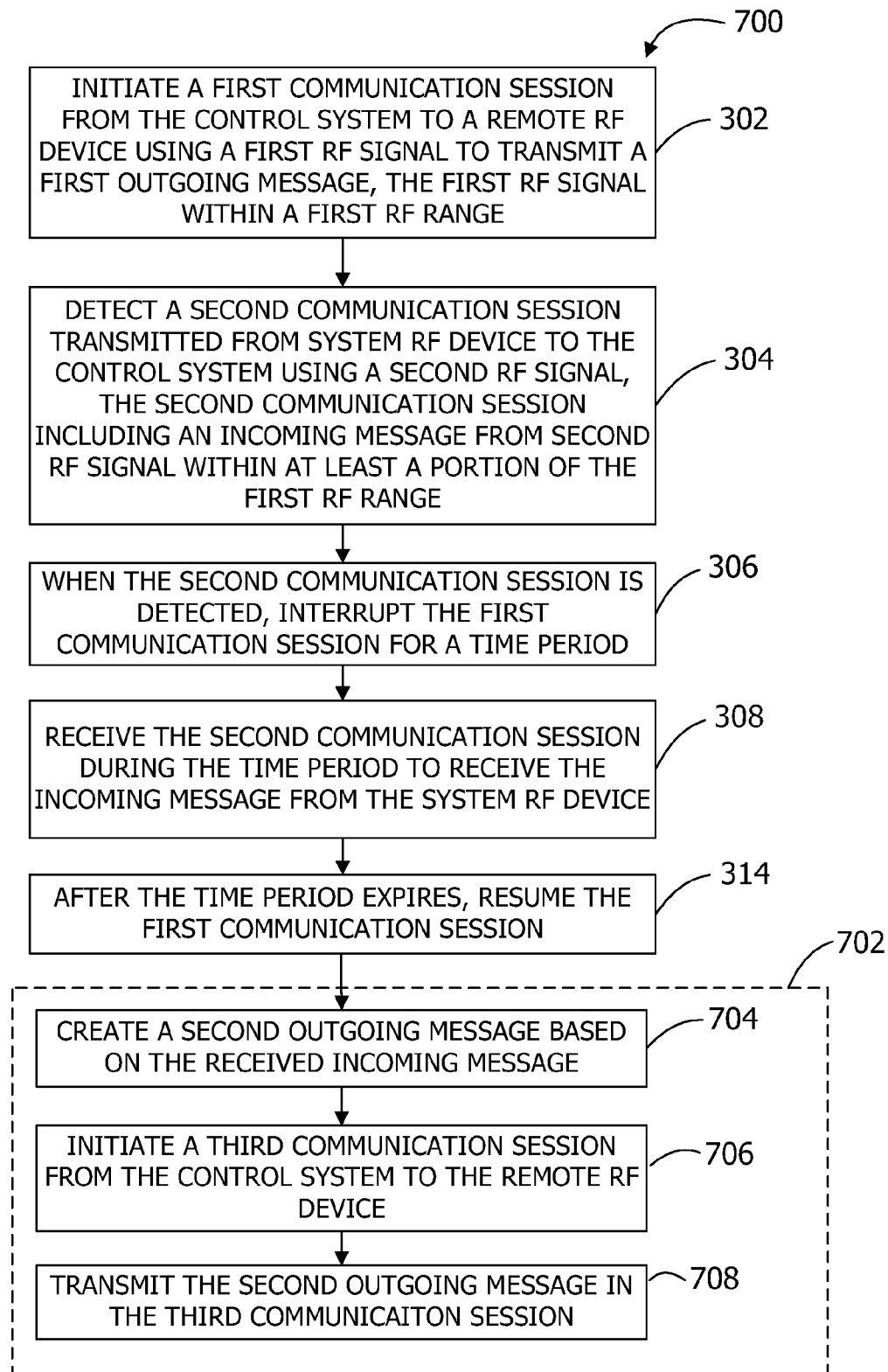

FIG. 8 is a flowchart of a third alternative method 700 that may be used with security system 10 (shown in FIG. 1). Method 700 includes the some of steps of method 300 and, as such, similar components are labeled with similar references. Referring to FIGS. 1, 5, and 8, method 700 includes steps 302, 304, 306, 308, and 314, as described above. Additionally, either before or after first communication session 402 is resumed 314, control system 16 transmits 702 a second outgoing message. More specifically, to transmit 702 the second outgoing message, control system 16 creates 704 the second outgoing message based on the incoming message that was received 308. Creation 704 of the second outgoing message may occur before any communication sessions 402 and/or 414 are transmitted after time period 702 and/or may occur after at least first transmission session 402. Control system 16 initiates 706 third transmission session 414 to remote RF device 14 before or after first transmission session 402 is resumed 314. During third transmission session 414, control system 16 transmits 708 the second outgoing message to remote RF device 14.

In any of methods 300, 500, 600, and 700, control system 16 may be configured to, based on the incoming message, perform 312 an action, such as activating alarm module 50 and/or transmitting an outgoing message to second remote device 18. Also, in the above-described embodiments, if RF transmitter-receiver module 26 includes additional transmitter-receivers 43 such that RF transmitter-receiver module 26 can maintain multiple concurrent communication sessions, a command 34 directing RF transmitter-receiver module 26 to interrupt 306 communication causes RF transmitter-receiver module 26 to interrupt 306 communication occurring through all RF transmitter-receivers 42 and 43. Similarly, communication through all RF transmitter-receivers 42 and 43 is resumed 314 after time period 702 to complete the multiple communication sessions.

The above-described method and systems are configured to reduce interference between an RF transmitter-receiver, such as a GSM transmitter-receiver, and a proximately positioned RF receiver. More specifically, by interrupting an RF signal, such as a GSM signal, within the same, or overlapping, frequency range as RF signals received by the RF receiver, the embodiments described herein enable GSM signals and other RF signals to be properly transmitted and/or received. It should be understood that the embodiments described herein can also be used when first RF signals overlap the frequency range of second RF signals by way of its associated harmonics, producing signal interference despite having its main signal in a different frequency range. As such, the above-described control system properly receives messages encoded in RF signals that are transmitted by a remote device or sensor for subsequent transmission by RF signals to a remote RF receiver. Further, a notch filter can be used as a backup or redundancy to the interruption of RF signals. However, by omitting the notch filter from the above-described control system, the cost of the control system may be reduced.

A technical effect of the systems and method described herein includes at least one of: (a) initiating a first communication session from a control system to a remote RF device using a first RF signal to transmit a first outgoing message to the remote RF device, the first RF signal within a first RF range; (b) detecting, at the control system, a second communication session transmitted from a system RF device to the control system using a second RF signal, the second communication session including an incoming message from the system RF device, the second RF signal within a second RF range at least partially overlapping the first RF range; (c) when the second communication session is detected, interrupting the first communication session for a time period; (d) receiving the second communication session during the predetermined time period to receive the incoming message from the system RF device; and (e) after the time period expires, resuming the first communication session with the remote RF device.

Exemplary embodiments of a method and systems configured to reduce interference between GSM signals and RF signals are described above in detail. The method and systems are not limited to the specific embodiments described herein, but, rather, components of systems and/or steps of the methods may be utilized independently and separately from other components and/or steps described herein. For example, the methods may also be used in combination with other RF and GSM systems and methods, and are not limited to practice with only the security system and method as described herein. Rather, the exemplary embodiment can be implemented and utilized in connection with many other RF and GSM applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of reducing interference between radio frequency (RF) signals, said method comprising:
    initiating a first communication session from a control system to a remote RF device using a first RF signal to transmit a first outgoing message to the remote RF device, the first RF signal within a first RF range;
    detecting, at the control system, a second communication session transmitted from a system RF device to the control system using a second RF signal, the second communication session including an incoming message from the system RF device, the second RF signal within a second RF range at least partially overlapping the first RF range;

when the second communication session IS detected, interrupting the first communication session for a predetermined time period;
receiving the second communication session during the predetermined time period to receive the incoming message from the system RF device; and
after the predetermined time period expires, resuming the first communication session with the remote RF device.

2. A method in accordance with claim 1, wherein:
interrupting the first communication session comprises terminating the first communication session; and
resuming the first communication session comprises:
initiating a third communication session after the predetermined time period expires;
transmitting the first outgoing message in the third communication session; and
completing the third communication session.

3. A method in accordance with claim 1, wherein resuming the first communication session comprises:
creating a second outgoing message based on the received incoming message; and
transmitting the second outgoing message in the resumed first communication session.

4. A method in accordance with claim 1, further comprising:
creating a second outgoing message based on the received incoming message;
initiating a third communication session from the control system to the remote RF device; and
transmitting the second outgoing message in the third communication session.

5. A method in accordance with claim 1, wherein initiating a first communication session from the control system to a remote RF device further comprises initiating a Global System for Mobile Communications (GSM) signal as the first RF signal.

6. A method in accordance with claim 1, wherein detecting a second communication session initiated from a system RF device to the control system using a second RF signal further comprises detecting a second communication session comprising a plurality of identical transmission packets transmitted from the system RF device to the control system.

7. A method in accordance with claim 6, wherein detecting a second communication session comprising a plurality of identical transmission packets further comprises detecting a plurality of identical transmission packets, wherein each of the identical transmission packets comprises a synchronization portion, a start portion, and a message portion.

8. A control system, comprising:
a radio frequency (RF) transmitter-receiver module configured to transmit and receive first RF signals within a first RF range, said RF transmitter-receiver module comprising at least one RF transmitter-receiver;
an RF receiver module configured to receive second RF signals within a second RF range that at least partially overlaps the first RF range, said RF receiver module comprising at least one RF receiver; and
a processor coupled in communication with said RF transmitter-receiver module and said RF receiver module, said processor configured to:
engage in a first communication session with a remote RF device using said RF transmitter-receiver module to transmit a first outgoing message within said first RF signals;
detect a second communication session with said second RF signals using said RF receiver module, said second RF signals transmitted by a system RF device and comprising an incoming message encoded therein;
when said second communication session is detected, interrupt said first communication session for a predetermined time period;
receive said second RF signals during said predetermined time period using said RF receiver module; and
after said predetermined time period expires, resume said first communication session.

9. A control system in accordance with claim 8, further configured to:
terminate said first communication session;
begin counting said predetermined time period;
after said predetermined time period expires, initiate a third communication session with said remote RF device using said RF transmitter-receiver module to transmit the first outgoing message; and
complete said third communication session.

10. A control system in accordance with claim 8, wherein said processor is further configured to:
create a second outgoing message based on the received incoming message; and
transmit the second outgoing message in said first communication session when said first communication is resumed.

11. A control system in accordance with claim 8, wherein said processor is further configured to:
create a second outgoing message based on the received incoming message;
initiate a third communication session from the control system to the remote RF device after said predetermined time period expires; and
transmit the second outgoing message in said third communication session.

12. A control system in accordance with claim 8, wherein said processor is further configured to concurrently engage in a plurality of bidirectional communication sessions with each remote device of a plurality of remote devices using said RF transmitter-receiver module, said processor configured to:
interrupt said plurality of bidirectional communication sessions; and
resume said plurality of bidirectional communication sessions.

13. A control system in accordance with claim 8, wherein the system RF device comprises at least one or a motion sensor, a glass-break sensor, a door sensor, a window sensor, a smoke sensor, a temperature sensor, a water sensor, a shock sensor, and a carbon monoxide sensor.

14. A security system, comprising:
at least one sensor comprising a radio frequency (RF) transmitter;
at least one remote device comprising an RF transmitter-receiver, said at least one remote device located remotely from said at least one sensor; and
a control system comprising at least one RF receiver configured to communicate with said at least one sensor and at least one RF transmitter-receiver configured to communicate with said at least one remote device, said control system located remotely from said at least one sensor and said at least one remote device, said control system configured to:
initiate a first transmission session of a first RF signal to said at least one remote device, the first RF signal within a first RF range, the first RF signal having a first outgoing message encoded therein;
detect a second transmission session of a second RF signal transmitted by said at least one sensor, the second RF signal within a second RF range at least partially overlapping the first RF range;

when the second transmission session is detected, interrupt the first transmission for a predetermined time period;

receive at least one incoming message from said at least one sensor during the predetermined time period, the at least one incoming message encoded in the second RF signal; and after the predetermined time period expires, resume the first transmission session with the first outgoing message encoded therein to said at least one remote device.

15. A security system in accordance with claim 14, wherein:

said at least one remote device further comprises a Global Standard for Mobile Communications (GSM) transmitter-receiver; and said at least one RF transmitter-receiver further comprises a GSM transmitter-receiver.

16. A security system in accordance with claim 14, wherein said at least one sensor comprises at least one of a motion sensor, a glass-break sensor, a door sensor, a window sensor, a smoke sensor, a temperature sensor, a water sensor, a shock sensor, and a carbon monoxide sensor.

17. A security system in accordance with claim 14, wherein said at least one incoming message comprises a synchronization portion, a start portion, and a message portion.

18. A security system in accordance with claim 14, wherein said at least one sensor is configured to transmit a series of transmission packets each including the incoming messages encoded therein.

19. A security system in accordance with claim 14, further comprising an alarm module, wherein said control system is further configured to:

determine an action to be performed based on the incoming message; and activate said alarm module as the determined action to perform.

20. A security system in accordance with claim 14, wherein said control system is further configured to:

create a second outgoing message based on the at least one incoming message; and after the predetermined time period expires, transmit the second outgoing message to said at least one remote device.

* * * * *